United States Patent [19]

Shaffer

[11] 3,947,222

[45] Mar. 30, 1976

[54] PHOTOGRAPHIC FLASHLAMP UNIT

[75] Inventor: John W. Shaffer, Williamsport, Pa.

[73] Assignee: GTE Sylvania Incorporated, Danvers, Mass.

[22] Filed: Jan. 22, 1973

[21] Appl. No.: 325,601

Related U.S. Application Data

[63] Continuation of Ser. No. 861,126, Sept. 25, 1969, abandoned.

[52] U.S. Cl. .................................................. 431/93
[51] Int. Cl.² ........................................... F21K 5/02
[58] Field of Search ................................... 240/1.3; 431/93–95

[56] References Cited
UNITED STATES PATENTS 3,537,367  11/1970  Van Duser ...................... 431/93 X
3,597,603  8/1971   McDonough ...................... 240/1.3
3,624,727  11/1971  Horton et al. ................... 240/1.3 X Primary Examiner—Carroll B. Dority, Jr.
Attorney, Agent, or Firm—Edward J. Coleman

[57] ABSTRACT

A multilamp photographic flashlamp unit, the lamps of which are of the percussive primer type, having self-contained means in the form of a self-latching folded torsional spring for firing each of said lamps and featuring a short latch and a spring formation designed to give thereto a net downward force which holds the striker in contact with the flashcube base member.

7 Claims, 2 Drawing Figures

JOHN W. SHAFFER
INVENTOR

BY *Joseph C. Ryan*
ATTORNEY

PHOTOGRAPHIC FLASHLAMP UNIT

This is a continuation of application Ser. No. 861,126, filed Sept. 25, 1969, and now abandoned.

This invention relates to multilamp photographic flash units, commonly called flashcubes, and more particularly to flashcubes having lamps of the percussive primer type and the means employed to fire them.

Generally speaking, a percussive-type photoflash lamp comprises an hermetically sealed, light-transmitting envelope containing a source of actinic light and having a primer secured thereto. More particularly, the percussive-type photoflash lamp may comprise a length of glass tubing constricted to a tip at one end thereof and having a primer sealed therein at the other end thereof. The length of glass tubing which defines the lamp envelope contains a combustible such as shredded zirconium foil and a combustion-supporting gas such as oxygen. The primer may comprise a metal tube and a charge of fulminating material on a wire anvil supported therein. Operation of the lamp is initiated by an impact onto the tube of the primer to cause deflagration of the fulminating material on the wire anvil up through the tube to ignite the combustible disposed in the lamp envelope.

Heretofore, several different means have been suggested for firing these percussive-type flashlamps, many of which involve some form of spring mechanism built into the camera. More recently it has been suggested that the firing means be self-contained within the body of the flashcube itself and a separate one of these means be provided for each of the lamps. Various forms and types of springs have been suggested for this purpose, one of the most practical being a folded torsion spring described in the co-pending application of J. W. Shaffer, Ser. No. 785,098, filed Dec. 19, 1968, and now Pat. No. 3,597,604 entitled "Photographic Flashlamp Unit, and assigned to the same assignee as this invention. In accordance with the principles of that invention, each percussive-type flashlamp in the flashcube is provided with its own folded torsion spring to store the energy for firing it, with the tip of the stationary end of the spring shaped to function as a catch to hold the striker formed on the movable end thereof while the spring is in the cocked position. Displacement of the cocked striker to release it from the catch and thus permit it to strike the tube of the primer and fire the lamp is effected by a suitable finger or the like reciprocatively supported in a camera and arranged to move up through a slot provided therefor in the flashcube base to engage and displace the striker.

Although the foregoing arrangement, as described in the referenced application, provided a significant improvement over the several arrangements previously suggested, several shortcomings have been noted. Previous self-latching, folded torsional springs were designed to achieve a minimized release force rather than a minimized release travel. Accordingly, there was generally a relatively large displacement against a small force in order to achieve release. Such springs had either no net downward striker force, when cocked, or had a very low downward force. Actuator displacements and the associated spring latch length were relatively high.

Many disadvantages were inherent in the former spring construction. The large actuator movement was difficult to attain in inexpensive camera mechanisms. The initial or rest elevation of the striker was poorly defined, which contributed to poor release uniformity and lamp-shutter synchronization. A very severe problem with the previous spring designs was that they would often release inadvertently when the percussive flashcube was vibrated, jarred or dropped. Such inadvertent spring release flashes the lamp associated with that particular spring. Commercial shipping, handling and marketing of such a sensitive product would be a formidable task and the resulting high rate of product loss due to inadvertent flashing would increase the ultimate cost of the percussive flashcube to the consumer.

Thus one of the principal objects of this invention is to provide a self-latching, folded torsional spring for percussive flashcubes that is highly resistant toward inadvertent release but which can be intentionally released with low energy and a low camera actuator travel.

I have found that high resistance toward inadvertent spring release can be achieved without exceeding the release energy available from the camera actuator mechanism. This may be accomplished by making the latch as short as possible and forming the spring so that there is a net downward force which holds the striker in contact with the top face of the base of the flashcube. Since inadvertent release is caused by inertial flexing of the spring during vibration or impact, the initial downward force of the striker is adjusted, by proper choice of angles and lengths in the spring design, so that inertial forces are insufficient to cause striker movement and subsequent release. In general, this downward force present with the striker in contact with the flashcube base may be from about two ounces to about one ounce less than can be supplied by the camera actuator, which may be about six ounces. I have found that springs constructed in this manner are stable to inadvertent release even when the percussive flashcube is dropped from six feet or more onto a concrete surface. On the other hand, intentional release is obtained easily because very low camera actuator energies are required. This is possible because energy is equal to the product of acting force and distance, and the distance is reduced to a very small fraction of an inch, thereby making the force times distance product small even when the force is several ounces.

In view of the foregoing, it will be apparent to those skilled in the art that one of the advantages of this invention is the provision of a self-latching, folded torsional spring for percussive flashcubes that is highly resistant to inadvertent releasing caused by vibration or dropping of the flashcubes.

Another advantage is that in addition to being stable toward inadvertent release it is also reliably triggered by a low energy camera actuator mechanism.

A further advantage is that the required camera actuator travel is less than for previous spring models and thus greatly facilitates synchronization of spring release with the camera shutter.

In the specific embodiment of the invention illustrated in the accompanying drawing.

Figure 1:
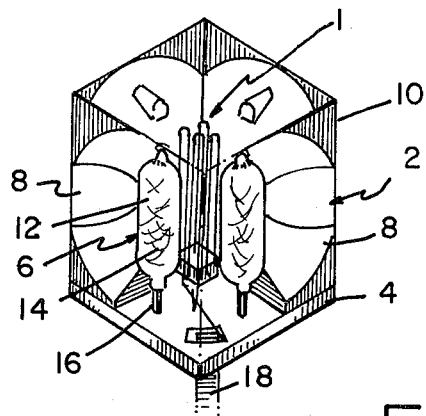
FIG. 1 is a perspective view of a flashcube embodying the principles of this invention with a portion of the flashcube broken away for clarity of illustration.

In the specific embodiment illustrated in the accompanying drawing, the flashcube 2 comprises a substantially rectangular base 4 along each side of which a percussive-type flashlamp 6 is arranged. Each lamp 6 is provided with its own reflector 8 and the assemblage of lamps and reflectors is enclosed in a transparent container 10 secured to the base 4. Each lamp 6 comprises a hermetically sealed, light-transmitting envelope 12 having a primer depending therefrom and a filling of combustible foil 14 and a combustion-supporting gas disposed therein. The primer comprises a metal tube 16 within which an anvil and a charge of fulminating material are disposed.

Figure 2:
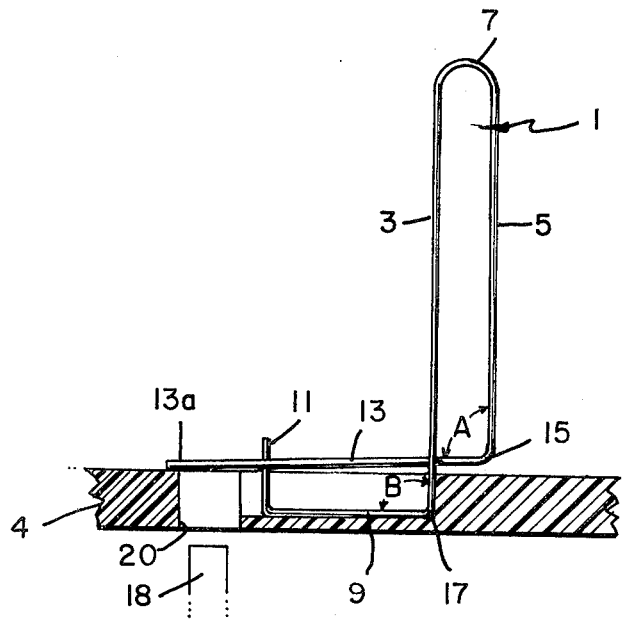
FIG. 2 is an enlarged, sectional, fragmentary elevational view showing particularly the details of a torsional spring mounted in a flashcube base.

As shown particularly in FIG. 2, the folded torsion spring 1 is formed from 0.021 inch diameter music wire. The wire is shaped to define a hairpin torsional section having segments 3 and 5 and a bight 7. The end portion of segment 3 is shaped to define a stationary foot 9, the tip of which is shaped to define a latch 11. The end portion of segment 5 is shaped to define a striker 13 which, when the spring is cocked as shown, crosses over the stationary foot 9 and is restrained by latch 11. The junction of segment 5 and striker 13 is referred to hereinafter as the striker heel 15 and the angle formed thereat as Angle A. The junction of segment 3 and foot 9 is referred to hereinafter as the foot heel 17 and the angle formed thereat at angle B.

The stationary foot 9 is seated in an elongated slot formred in the base 4 on or near a diagonal thereof, said slot being sufficiently shallow so that the latch 11 formed on the free end of the foot 9 projects above the plane of the top face of the base 4. Displacement of the cocked striker 13, to release it from the latch 11 and thus permit it to strike the tube 16 of the primer and fire the lamp, is effected by a suitable finger 18 or the like moving up through a slot 20 provided therefor in the base. The finger 18 may be part of a camera mechanism designed to enable a photographer to flash a lamp in synchronization with the tripping of the camera shutter to take a picture. Thus when the finger 18 pushes the striker 13 upwardly a distance sufficient to clear the top of the latch 11, the striker swings clockwise and hits and indents the impact-sensitive primer tube 16 at high velocity to cause deflagration of the fulminating material located therein and thus ignite the combustible foil 14.

As noted above, the spring 1 of the specific embodiment is formed from 0.021 inch diameter music wire. The length of hairpin torsional segment 3 is 0.815 inch and segment 5 is 0.675 inch long. The length of the striker 13 is 0.395 inch. The foot 9 is 0.205 inch long and the slot in which it is seated is about 0.110 inch deep. The length of the latch 11 is 0.145 inch. Angle A is about 101° and angle B is about 86°. The exposed latch length is about 0.035 inch and the force of the striker 13 against the base 4 at 13a is about two ounches. Nine flashcubes containing thirty-six such springs were dropped from a height of 8 foot 4 inch onto a concrete surface and none of the springs released.

A similar test was conducted using substantially the same spring design except that it was not formed in accordance with the principles of this invention. The latch length was 0.165 inch, angle A was 96° and angle B was 90°. The downward force exerted by this striker was less than one ounce. Five flashcubes containing twenty such springs were dropped 8 foot 4 inch onto a concrete surface and four springs or 20 percent released.

As noted above, the latch should be as short as possible and the spring should be formed so that there is a net downward force which holds the striker in contact with the top face of the base of the flashcube. I have found that for best results, the exposed latch length above the top face of the flashcube base should not be more than about three times the diameter of the wire used. The downward forces should be not less than one ounce and preferably two or more ounces. This may be assured by shaping the spring so that angle A is between 90° and 120° and angle B is between 80° and 90°.

What I claim is:

1. A photographic flashlamp unit comprising:
   a plurality of percussively-ignitable flashlamps with primer tubes depending therefrom;
   a plurality of folded torsional resilient devices for firing said flashlamps, each of said devices being disposed in operative relationship with respect to one of said flashlamps and each of said devices comprising a substantially hairpin torsional section having a projection of one leg thereof at a substantially normal but obtuse angle thereto defining a striker, a projection of the other leg thereof at a substantially normal but acute angle thereto defining a foot and a projection of said foot substantially normal thereto defining a latch, said striker crossing said latch whereby said latch restrains said striker in a cocked position; and a base on which said flashlamps and said folded torsional devices are mounted, said base having elongated slots formed therein within which the foot of each of said folded torsional devices is seated, the free end of said latch projecting above the top face of said base and the free end of said striker bearing against the top face of said base, the configuration of said folded torsional device urging the free end of said striker downwardly against the top face of said base with a net force of greater than about one ounce, said force holding the free end of said striker in contact with the top face of said base.

2. The combination of claim 1 in which the length of the exposed segment of the latch above the top face of the base is not more than about three times the diameter thereof.

3. The combination of claim 1 in which the angle formed by the striker and its associated leg of the hairpin torsional section is between about 96° and 120° and the angle formed by the foot and its associated leg of the hairpin torsional section is between about 80° and 88°.

4. The combination of claim 1 in which the net force of the free end of said striker against the top face of said base is between about two and five ounces.

5. The combination of claim 4 in which the angle formed by the striker and its associated leg of the hairpin torsional section is about 101° and the angle formed by the foot and its associated leg of the hairpin torsional section is about 86°.

6. The combination of claim 4 in which the angle formed by the striker and its associated leg of the hairpin torsional section is between about 96° and 120° and the angle formed by the foot and its associated leg of the hairpin torsional section is between about 80° and 88°.

7. The combination of claim 6 in which the length of the exposed segment of the latch above the top face of the base is not more than about three times the diameter thereof.

* * * * *